United States Patent [19]

Garner

[11] Patent Number: 5,109,658
[45] Date of Patent: May 5, 1992

[54] METHOD AND APPARATUS FOR REMOVING BINDER FROM AROUND TELECOMMUNICATIONS CABLE CORE

[75] Inventor: John N. Garner, Kingston, Canada

[73] Assignee: Northern Telecom Limited, Montreal, Canada

[21] Appl. No.: 515,144

[22] Filed: Apr. 26, 1990

[51] Int. Cl.$^5$ ............................................. D01H 1/00
[52] U.S. Cl. .......................................... 57/2.5; 57/264
[58] Field of Search ............................ 57/2.3, 2.5, 264

[56] References Cited

U.S. PATENT DOCUMENTS

| | | | |
|---|---|---|---|
| 353,938 | 12/1886 | Harrison | 57/2.5 |
| 2,258,139 | 10/1941 | Johnston | 57/2.5 |
| 3,724,189 | 4/1973 | Bishop et al. | 57/2.5 |
| 4,628,675 | 12/1986 | Sakamoto | 57/264 X |

FOREIGN PATENT DOCUMENTS 385207 11/1923 Fed. Rep. of Germany ......... 57/2.5
904786 2/1954 Fed. Rep. of Germany ......... 57/2.5

*Primary Examiner*—Joseph J. Hail, III
*Attorney, Agent, or Firm*—R. J. Austin

[57] ABSTRACT

A method and apparatus for removing binder from around a telecommunications cable core. The apparatus comprises a binder take-up reel, drive for rotating the take-up reel around a passline for cable core, and binder unwinding and guide mechanisms which are freely rotatable about a take-up reel station. The apparatus is economical in construction and requires only one drive motor, for the take-up reel, because rotation of the binder unwinding and guide mechanism is driven by binder tension as binder is unwound from the core. The binder unwinding and guide mechanism provides simple mechanical mechanism to control the speed of rotation of the binder unwinding and guide mechanism and the speed of rotation of the take-up reel relative to the cable core speed along the passline so that the binder is in tension as it is unwound controllably from the core.

11 Claims, 3 Drawing Sheets

METHOD AND APPARATUS FOR REMOVING BINDER FROM AROUND TELECOMMUNICATIONS CABLE CORE

BACKGROUND OF THE INVENTION

This invention relates to a method and apparatus for removing binder from around a telecommunications cable core.

Conventionally, telecommunication cables are constructed of multiple pairs of individually insulated conductors grouped together to form a cable core, which may then be surrounded by a protective sheath. During manufacture of a cable, a spirally applied binder tape or filament may be wound around conductors of the core, for the purpose of holding together the conductors along the length of the cable core, before application of surrounding material such as a core wrap, a protective sheath and a cable jacket. Binder tapes or filaments may also be used to separate and identify, by binder colour, each of a number of groups of conductors forming separate core units which are assembled together to form the cable core of a large diameter multiconductor cable.

Testing of cable cores following their manufacture may reveal defective conductors. If it is required to remove and replace a defective conductor pair with a new conductor pair, or to reuse (recycle) good conductors, the binder tape must first be removed before the conductors can be separated from the group. The binder tape is removed manually by cutting and unwinding the binder, and this task is labor intensive and time consuming.

SUMMARY OF THE INVENTION

The present invention seeks to provide an apparatus for unwinding binder from a telecommunications cable core.

According to one aspect of the present invention, an apparatus for removing spirally wrapped binder from around a telecommunications cable core is provided comprising:—drive means disposed at a location along a passline for cable core, the drive means for rotating around the passline a take-up reel for binder when the take-up reel is disposed in a take-up reel station; binder unwinding and guide means which is freely rotatable about the passline and is operable for guiding binder to the take-up reel station from a cable core moving along the passline so that during operation of the drive means with a take-up reel in the take-up reel station binder is taken up around the take-up reel, the unwinding and guide means being rotatable under binder tension to cause unwinding of the binder from the core; and the apparatus also comprising means to control the speeds of rotation of the take-up reel when driven by the drive means and of the unwinding and guide means relative to the cable core speed along the passline so that the binder is in tension during take-up of binder and is controllably unwound from the cable core.

The apparatus according to the invention as defined above is capable of controllably removing binder from a cable core thereby reducing the time required compared with manual removal of binder while also avoiding intensive manual labor.

In a preferred arrangement, the binder unwinding and guide means comprises a guide element freely pivotally mounted about an axis so as to be pivoted dependent on the angle of the binder as it leaves the cable core, the guide element operably connected to the control means to cause operation of the control means at a certain pivotal position of the guide element corresponding to a limiting position of the binder upstream as it leaves the cable core.

The guide element allows for a simple and easily constructed operational design for causing operation of the control means.

In other arrangements, operation of the control means is controlled by devices other than the guide element. In these arrangements operation of the control means is caused by a limit sensor for detecting the position at which binder leaves the core or by a sensor for measuring the binder speed, the sensor being operably connected to the control means for operating the control means when the sensor detects binder parameters beyond predetermined limits.

According to a further aspect of the invention, there is provided a method of removing binder from around a telecommunications cable core, the method comprising: controllably passing the cable core along a passline and through a binder take-up reel being rotatably driven around the cable core and, during movement of the cable core along its passline and during rotation of the reel, passing the binder through a binder guide means which is freely rotatable around the passline and around the binder take-up reel, the binder moving from the binder guide means and being wound around the rotating take-up reel, tension in the binder applying a torque to cause rotation of binder guide means around the passline to enable the binder to be unwound from the core; and controlling the speed of rotation of the binder guide means and the speed of rotation of the take-up reel relative to the cable core speed along the passline so that the binder is in tension during take-up of the binder and is controllably unwound from the cable core.

BRIEF DESCRIPTION OF THE DRAWINGS

Embodiments of the invention will now be described by way of example, with reference to the accompanying drawings, in which:—

DESCRIPTION OF THE PREFERRED EMBODIMENT

Figure 1:
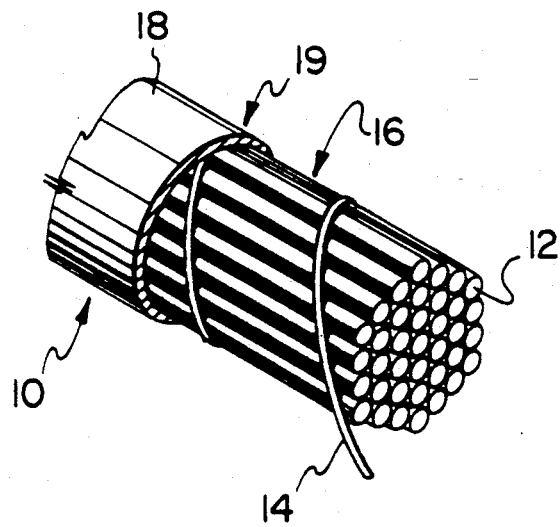
FIG. 1 is an isometric stepped sectional view of a telecommunications cable.

A telecommunications cable 10, as shown in FIG. 1, has a conventionally constructed core 16 of multiple pairs of twisted together individually insulated conductors 12 grouped together by stranding and bound with a spirally bound binder tape 14. Twisting and stranding of the conductors are not shown in FIG. 1, to simplify the drawing. A protective sheath 18 and a jacket 19 are applied over the cable core 16 to provide the finished cable 10.

Figure 2:
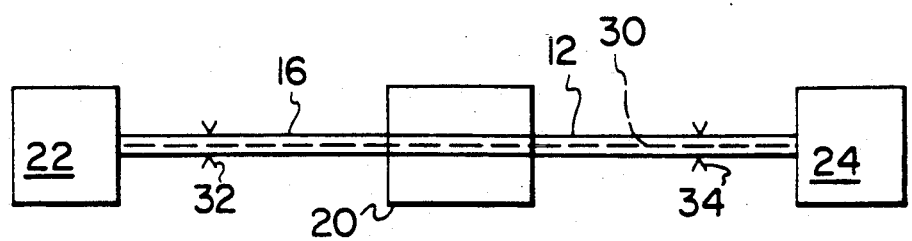
FIG. 2 is a block diagram of an assembly of a cable core unreeler, an apparatus for removing binder from a telecommunications cable core according to the embodiment, and a cable core reeler.

An apparatus 20 for removing binder from a telecommunications core according to the embodiment is shown in FIGS. 2 to 5. The apparatus 20 forms part of an in-line assembly comprising a cable core unreeler 22, the apparatus 20, and a cable core reeler 24 (FIG. 2). The cable core unreeler 22, from which the bound cable core is supplied to the apparatus 20, and the reeler 24, which takes up unbound cable core, are conventional and will not be described further. The assembly 21 provides a passline 30 for cable core 16 from the cable core unreeler 22, through guide rollers 32, through the apparatus 20, and through further guide rollers 34 to the cable reeler 24.

Figure 3:
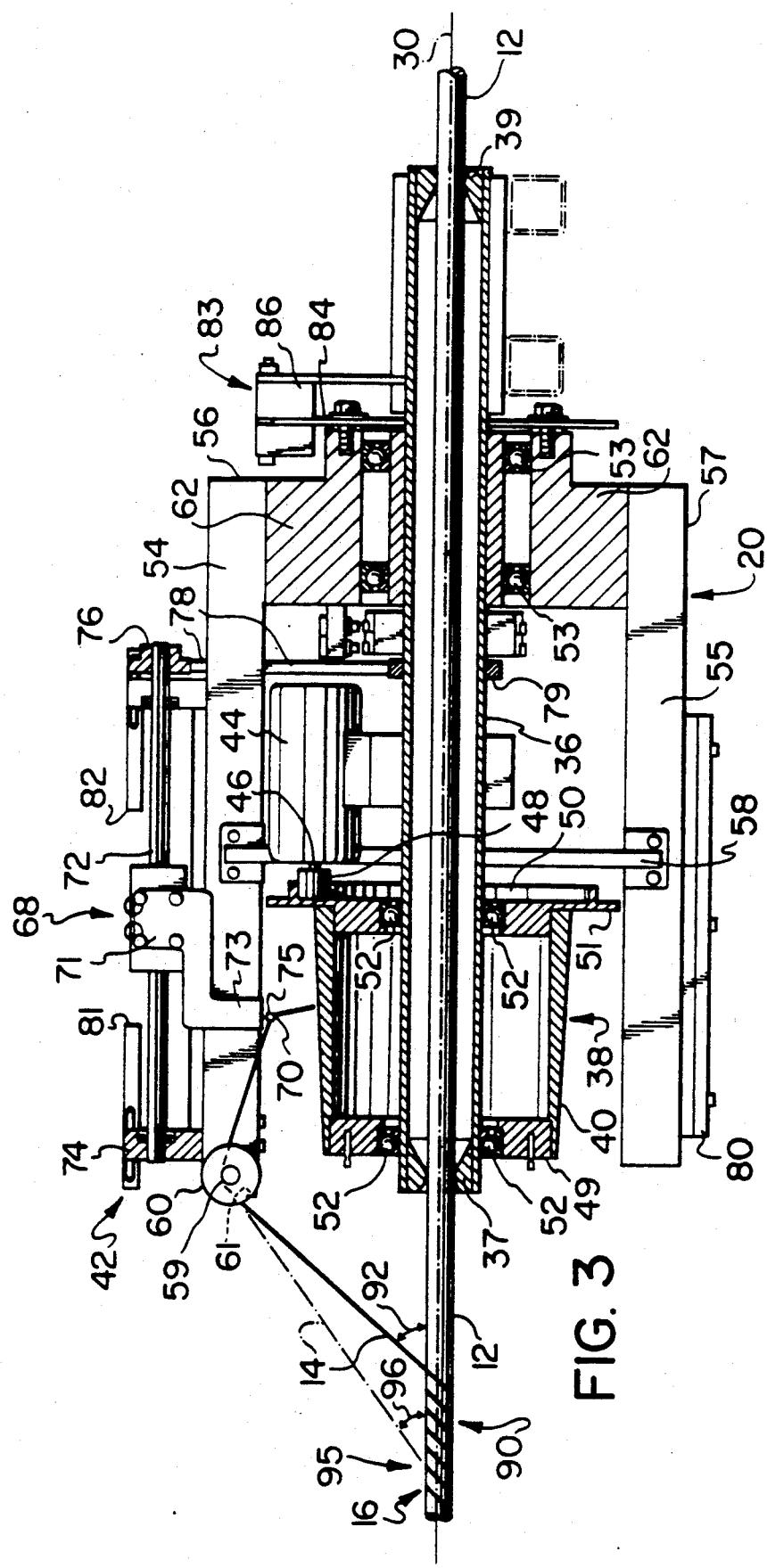
FIG. 3 is a cross-sectional view of the apparatus for removing binder from a telecommunications cable core according to the embodiment, showing a cable core along the passline.

The apparatus 20, shown in cross-sectional view along the passline 30 in FIG. 3, comprises a center cylindrical guide shaft 36 surrounding the passline 30 for cable core 16, a binder take-up reel station 38 and binder unwinding and guide means 42. The ends 37 and 39 of the cylindrical shaft 36 are shaped to prevent the cable core 16 from wandering sideways as it moves through the guide shaft 36. The shaft 36 forms a common mounting for the unwinding and guide means 42 and for a drive means and control means to be described.

A take-up reel 40 is permanently mounted in the take-up reel station 38. The take-up reel 40 is concentrically mounted upon the shaft 36 by bearings 52 held within ends 49 and 51 of the reel. One end 51 of the reel extends outwardly beyond the reel diameter to provide an internally geared axial flange 50. The take-up reel is tapered towards an upstream open end 49 as shown in FIG. 3 for a reason to be described. Drive means are provided for rotating the take-up reel 40 around the passline 30. The drive means comprises an electric motor 44 having a driving gear 48 mounted upon its drive shaft 46, the driving gear 48 engaging the geared flange 50 of the take-up reel 40.

The binder unwinding and guide means 42 comprises a binder guide element 60 mounted on an upstream end of a support member 54, which is an axially extending arm in a position spaced radially outside the take-up reel 40 mounted in the take-up reel station 38. The unwinding and guide means 42 also includes a second binder guide element 70 provided as part of a traverse mechanism 68. The guide elements 60 and 70 and the traverse mechanism are discussed in detail below. The support member 54 is secured at one end 56 to a downstream end plate 62 freely rotatably mounted on the shaft 36 on bearings 53. A second support member 55, which is also an axially extending arm, diametrically opposed to support member 54 and carrying a counterweight 80, is also secured at one end 57 to the end plate 62 so as to provide for balanced rotation of the unwinding and guide means 42 around the guide shaft 36 at a desired operating speed. An annular bracing member 58 extends between the support members 54 and 55 around the take-up reel station. The unwinding and guide means 42 is operable, when cable core 16 is moving along the passline 30, for guiding binder 14 from the core 16, by way of the guide elements 60 and 70, to the take-up reel station 38 so that binder 14 is taken up around the take-up reel 40 during operation of the motor 44 and the binder unwinding and guide means 42 is rotatable under binder tension so as to unwind binder from the core 16 as will be described below.

The binder unwinding and guide means 42 includes a winding traverse mechanism 68 for controlling the winding of binder 14 onto the take-up reel 40. The winding traverse mechanism 68 has a movable element 71 which is axially traversable along a drive shaft 72. The binder guide element 70 is a flange, having a guiding eye 75 formed in it, provided in the free end of an arm 73 of the movable element 71 of the traverse mechanism 68. The traverse mechanism 68 also comprises a drive wheel in the form of gear 76 for the shaft 72. An endless flexible drive member 78 drivably passes around the gear 76 and around a non-rotatable wheel in the form of a gear 79 mounted concentrically around the guide shaft 36. The drive shaft 72 is rotatable by the endless flexible drive member 78 upon rotation of the binder unwinding and guide means 42 around the guide shaft 36. On rotation of the drive shaft 72, the moveable element 71 is caused to move alternately to and from along the shaft 72 between end stops 81 and 82 so that the guide element 70 causes binder to traverse from end to end of the take-up reel 40 as it is wound around the reel.

Figure 4:
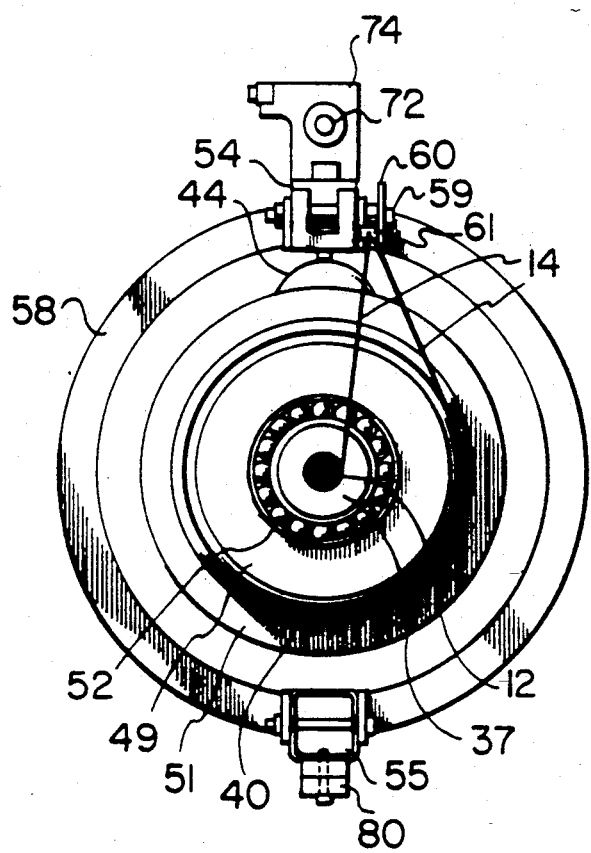
FIG. 4 is a view of the apparatus in the direction of arrow IV in FIG. 3, a cable core being shown in section.

The binder guide element 60 of the binder unwinding and guide means 42 has an eye 61 through which binder passes as it unwinds from the cable core 16 (see particularly FIG. 4). The angle 92 (FIG. 3) at which binder diverges from the cable core and approaches the guide element 60 is determined by the position along the passline at which binder detaches from the cable core The guide element 60 is freely pivotally mounted on a shaft 59 rotatable about an axis so that as the binder passes through the eye 61 and around the shaft 59, the guide element 60 is pivoted dependent on the angle 92 of binder 14 as it leaves the cable core 16. Since the angle 92 at which the binder 14 leaves the cable core 16 is dependent on position along the passline of the point of detachment 90 of the binder 14 from the cable core, the angular position of the eye 61 relative to the axis of the shaft 59 is dependent on the point of detachment 90. The rotatable shaft 59 has a trigger pin 89 extending through it and projecting radially from one side of the shaft 59. The trigger pin 89 forms part of an automatically operated switch means 94 of a control means now to control the speeds of rotation of the take-up reel 40 and of the binder unwinding and guide means 42 relative to the cable core speed along the passline 30. The control means will be described below. The trigger pin 89 is rotatable with the shaft 59 towards and away from a switch operating position, so that the guide element 60 is operably connected to the control means so as to cause operation of the control means at a certain pivotal position of the guide eye 61 on the guide element 60 which corresponds to a limiting position of the binder upstream as it leaves the cable core.

The means to control the speeds of rotation of the take-up reel 40 and of the binder unwinding and guide means 42 operates so that the binder 14 is in tension during take-up onto the reel 40, and so that the point of detachment 90 of the binder 14 from the cable core 16 is controllably maintained within limited range of positions along the passline 30, between the guide rollers 32 and the end 37 of the guide shaft 36.

Figure 5:
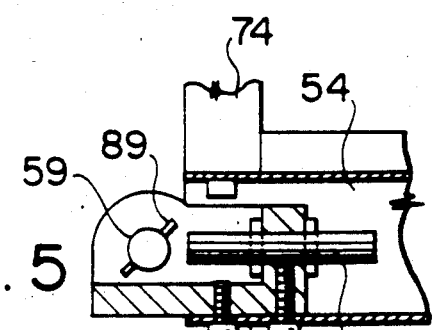
FIG. 5 is an enlarged cross-sectional view of a limit sensor and switch assembly of the binder unwinding and guide means.
Figure 6:
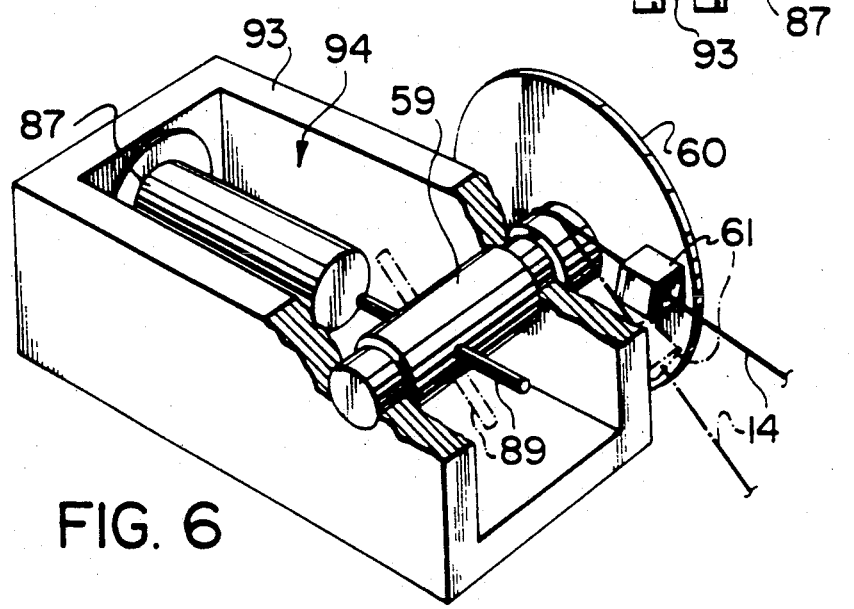
FIG. 6 is an isometric cut-away sectional view of the limit sensor and switch assembly.

The control means comprises a brake mechanism 83 to control the speed of rotation of the unwinding and guide means 42 and the automatically operated switch means 94 to operate the brake mechanism 83 so as to stop or slow down rotation of the binder unwinding and guide means 42 and interrupt the unwinding of the binder, should the point of detachment of the binder from the cable core move upstream beyond a preset limiting location With this object in mind, the automatically operated switch means 94 includes a limit sensor 88 which comprises the trigger pin 89 and a sensor element 87 so as to form a switch means of the type known as an inductive proximity sensor switch (FIGS. 5 and 6). The trigger pin 89 for operating the switch, being mounted on the freely rotatable shaft 59 of the binder guide element 60, is movable by pivoting movement of the shaft 59 towards and away from the sensor element 87 of the switch to cause operation of the switch. Thus the switch means 94 responds to changes in the angle of approach of the binder 14 to the binder unwinding and guide means 42 as governed by the position of the trigger pin 89 rotatable with the guide element 60 (FIG. 6). Signal from the sensor element 87 of the switch is transmitted through a slip ring arrangement to a control module which actuates the brake mechanism 83.

The brake mechanism 83 comprises a brake disc 84 secured to the end plate 62 and thus rotatable with the support member 54 about the passline, and brake callipers 86, secured to the guide shaft 36, for engaging the brake disc 84.

In use of the apparatus, the stranded together conductors 12 of the cable core 16 are directed through the guide shaft 36 and as the conductors of the cable core 16 move together along the passline 30, the binder 14 is caused to diverge from the conductors 12 and to move through the binder guide elements 60 and 70 on the binder unwinding and guide means 42 and to be guided onto the binder take-up reel 40 so that the binder is taken up around the binder take-up reel 40 as the reel rotates during operation of the drive means 44. As the binder 14 moves from the binder guide elements 60 and 70 and is wound around the take-up reel 40, tension in the binder 14 as it is wound onto the take-up reel applies sufficient torque to the binder guide means 60 to cause rotation of the binder unwinding and guide means 42 around the passline so as to unwind binder 14 from the cable core 16 as it moves along the passline 30. Rotation of the binder unwinding and guide means 42 around the guide shaft 36 also drives the operation of the traverse mechanism and movement of the guide element 70 on the traverse mechanism controls winding of the binder onto the take-up reel.

In theory, since the cable core 16 is moved along the passline 30 through the apparatus at a fixed speed, if the length of binder per unit length of cable core is known, the binder may be unwound at an appropriate and constant rate so that the position 90 along the passline 30 at which binder detaches from the cable core 16 as it unwinds remains stationary. Thus, the unwinding of the binder may be controlled simply by regulation of the speed of rotation of the take-up reel 40 relative to the cable core speed along the passline so that binder is unwound at a desired rate. However, this theoretical ideal is not achieved in practice In practice, it is desirable to be able to control the unwinding of the binder 14 by a simple and economical mechanical means. This is effected by regulation of the speeds of rotation of the take-up reel 40 and of the binder unwinding and guide means 42 relative to the cable core 16 speed along the passline 30 The binder unwinding speed can then more easily be regulated to accommodate cable cores having binder wound with different pitches.

In order to prevent bound cable core from advancing into the guide shaft, the rate at which binder is unwound per unit linear length of cable core is controlled by the speed of the motor 44 so as to be slightly greater than that required merely to keep pace with the rate at which cable core moves along the passline. Thus, the point 90 at which the binder 14 detaches from the surface of the cable core 12 tends to advance upstream from the guide shaft so that the angle between the passline 30 and the binder 14 decreases as binder is unwound from the core 12. When the point of detachment 90 of the binder from the cable core reaches a preset upstream limit 95 (as shown by the chain-dotted outline of binder tape 14 in FIGS. 3 and 6), as causing rotation of the trigger pin 89 of the limit sensor 88 into the switch operating position, the switch means 94 operates the brake mechanism 83 causing the brake to slow down rotation of the unwinding and guide means 42. The tension in the binder may then increase causing the motor 44 to slow down with resultant slowing down of the take-up reel 40. While the brake is applied, the cable core 12 continues to advance along the passline 30 so that the point of detachment 90 of the binder from the core will move downstream and bring the angle of approach of the binder within operating limits so that the trigger pin 89 rotates away from the switch operating position, causing the switch means 94 to release the brake mechanism 83.

The control means guards against unwinding the binder too quickly relative to the cable core speed, when the point of detachment of the binder will move upstream away from the guide shaft, which may lead to jamming or breakdown of the apparatus.

The apparatus of the embodiment operates using only one drive motor 44 and simple control means. A separate drive motor is not required on the binder unwinding means 42, it is driven solely by binder tension. The traverse mechanism 68 is also driven by rotation of the binder unwinding and guide means 42, which drives the endless flexible member 78, and thereby operates the drive shaft of the traverse mechanism, whereby the traverse mechanism does not require a separate drive motor. The take-up reel 40, binder unwinding and guide means 42 and control means of the apparatus are mounted on the single central guide shaft 36 to simplify construction of the apparatus. The apparatus is therefore of economical and simple mechanical construction and requires only limited control means or electronics.

The open end and tapered shape of the take-up reel allows binder to be easily removed from the take-up reel by pulling binder off the open end of the reel, avoiding the necessity for unwinding from the take-up reel binder which is to be discarded. It is therefore unnecessary for the take-up reel to be detachable from the apparatus. The winding diameter of the reel must be sufficiently large relative to the cable core diameter so that as binder is tensioned and wound onto the take-up reel, sufficient torque to the binder unwinding and guide means 42 is provided by tension in the binder to cause rotation of the binder unwinding and guide means 42. This may be seen readily from FIG. 4.

In a modification of the apparatus of the embodiment (not shown), the drive means comprises a drive motor 44 including a clutch mechanism which operates at a limiting tension of the binder to prevent binder tension increasing to the point of breakage of the binder and to prevent unnecessary strain on the motor.

Another modification of the apparatus of the embodiment comprises a take-up reel spindle provided around the guide shaft for rotatably mounting a removable take-up reel in the take-up reel station, so that the binder unwound from a cable core may be removed on the take-up reel.

Although the embodiment shown uses only a simple mechanical control means for regulating the unwinding of binder, control means for activating the brake mechanism may use alternative mechanical or computer assisted means and in further modifications of the apparatus alternative types of limit sensor may be used. In other arrangements of the apparatus, operation of the control means is controlled by devices other than the guide element 60. In these arrangements (not shown), operation of the control means is caused by a limit sensor for detecting the position at which binder leaves the core or by a limit sensor for measuring the binder speed, the sensor being operably connected to the control means for operating the control means when the sensor detects binder parameters beyond predetermined limits.

In further modifications, an alternative drive means comprises a variable speed motor for rotating the take-up reel and a limit sensor using electronically computer assisted means to control the speed of the drive means. The binder unwinding speed may then be continuously matched to the cable core speed to prevent both unwinding of binder too quickly, when the point of detachment will move upstream away from the guide shaft and unwinding of the binder too slowly, when bound cable core will advance downstream into the end 35 of the guide shaft 36, either situation which may lead to breakdown of the apparatus.

In addition an alternative brake means comprises a brake operable, for example, directly on the support member 54 of the unwinding and guide means instead of directly onto the end plate 62.

What is claimed is:

1. An apparatus for removing spirally wrapped binder from around a telecommunication cable core comprising:
   drive means disposed at a location along a passline for cable core, the drive means for continuously rotating around the passline a take-up reel for binder when the take-up reel is disposed in a take-up reel station;
   binder unwinding and guide means which is freely rotatable about the passline and is operable for guiding binder to the take-up reel station from a cable core moving along the passline whereby during operation of the drive means with a take-up reel in the take-up reel station, binder is guided from the cable core and taken up around the take-up reel thereby tensioning the binder, the binder tension causing rotation of the unwinding and guide means about the cable core so as to cause unwinding of the binder from the core; and
   means to control the speeds of rotation of the take-up reel and the unwinding and guide means relative to the cable core speed along the passline so that the binder is in tension during take-up of binder and is controllably unwound from the core,
   the binder unwinding and guide means comprising a guide element freely pivotally mounted about an axis so as to be pivoted dependent on the angle of the binder as it leaves the cable core, the control means providing an inductive proximity sensor switch and a trigger for operating the switch, the trigger movable by pivoting movement of the guide element towards and away from a switch operating position to cause operation of the control means at a certain pivotal position of the guide element corresponding to a limiting position of the binder upstream as it leaves the cable core.

2. An apparatus according to claim 1 wherein the binder unwinding and guide means comprises a support member, extending axially of the passline and radially spaced outside the take-up reel station, the support member being rotatably mounted at one end and carrying said guide element for directing binder away from a cable core moving along the passline.

3. An apparatus for removing spirally wrapped binder from about a telecommunication cable core comprising:
   drive means disposed at a location along a passline for cable core, the drive means for continuously rotating around the passline a take-up reel for binder when the take-up reel is disposed in a take-up reel station;
   binder unwinding and guide means which is freely rotatable about the passline and is operable for guiding binder to the take-up reel station from a cable core moving along the passline whereby during operation of the drive means with a take-up reel in the take-up reel station, binder is guided from the cable core and taken up around the take-up reel thereby tensioning the binder, the binder tension causing rotation of the unwinding and guide means about the cable core so as to cause unwinding of the binder from the core; and
   means to control the speeds of rotation of the take-up reel and of the unwinding and guide means relative to the cable core speed along the passline so that the binder is in tension during take-up of binder and is controllably unwound from the core,
   the control means comprising a disc brake operably connected to the unwinding and guide means and a switch means of the brake, the switch being operable to cause operation of the brake when the position at which the binder leaves the cable core reaches a certain limiting location upstream, so as to slow down rotation of the unwinding and guide means, the speed of rotation of the take-up reel being dependent on the tension in the binder during operation of the brake.

4. An apparatus according to claim 1 or 3 wherein the binder unwinding and guide means provides a winding traverse mechanism traversable by rotation of the binder unwinding and guide means, for guiding binder axially to and from end to end of the take-up reel as binder is taken up onto the take up reel.

5. An apparatus for removing spirally wrapped binder from around a telecommunications cable core comprising:
   drive means disposed at a location along a passline for cable core, the drive means for continuously rotating around the passline a take-up reel for binder when the take-up reel is disposed in a take-up reel station;
   binder unwinding and guide means which is freely rotatable about the passline and is operable for guiding binder to the take-up reel station from a cable core moving along the passline whereby during operation of the drive means with a take-up reel in the take-up reel station, binder is guided from the cable core and taken up around the take-up reel thereby tensioning the binder, the binder tension causing rotation of the unwinding and guide means about the cable core so as to cause unwinding of the binder from the core; and means to control the speeds of rotation of the take-up reel and of the unwinding and guide means relative to the cable core speed along the passline so that the binder is in tension during take-up of binder and is controllably unwound from the core; and the binder unwinding and guide means comprising a support member extending axially of the passline and radially spaced outside the take up reel station, the support member being rotatably mounted at one end and carrying a winding traverse mechanism for controlling binder winding on the take up reel, the traverse mechanism comprising a drive shaft and a traverse drive means operable dependent upon rotation of the support member around the passline, the traverse drive means around a wheel centred on the passline and around a rotatable wheel drivably connected to the drive shaft of the traverse mechanism so that the drive shaft is rotatable by the endless flexible drive member during rotation of the unwinding and guide means.

6. An apparatus according to claim 5 wherein the support member is rotatably mounted at one axial end to a center shaft around the passline and the control means comprises a brake positioned to apply a braking action at said one axial end.

7. An apparatus for removably spirally wrapped binder from around a telecommunications cable core comprising:

drive means disposed at a location along a passline for cable core, the drive means for continuously rotating around the passline a take-up reel for binder when the take-up reel is disposed in a take-up reel station;

binder unwinding and guide means which is freely rotatable about the passline and is operable for guiding binder to the take-up reel station from a cable core moving along the passline whereby during operation of the drive means with a take-up reel in the take-up reel station, binder is guided from the cable core and taken up around the take-up reel thereby tensioning the binder, the binder tension causing rotation of the unwinding and guide means about the cable core so as to cause unwinding of the binder from the core; and means to control the speeds of rotation of the take-up reel and of the unwinding and guide means relative to the cable core speed along the passline so that the binder is in tension during take-up of binder and is controllably unwound from the core; and the binder unwinding and guide means comprising a support member, extending axially of the passline and radially spaced outside the take-up reel station, the support member being rotatably mounted at one end and carrying a winding traverse mechanism for controlling binder winding on the take-up reel;

the control means including a brake mounted at said one end of the support member and a switch for operating the brake; and the unwinding and guide means further has a guide element which is pivotally mounted on the support member and the pivotal position of the guide element is dependent upon the angle of the binder leaving the cable core, the guide element operable to cause activation of the switch at a certain pivotal position of the guide element corresponding to a limiting position of the binder upstream as it leaves the cable core so as to slow down rotation of the unwinding and guide means, the speed of rotation of the take up reel being dependent on the tension in the binder during operation of the brake.

8. An apparatus according to any one of claim 1 to 7 provided with a center shaft surrounding the passline, the center shaft forming a common mounting for the unwinding and guide means, the drive means and the control means.

9. An apparatus according to any one of claim 1 to 7 provided with a center shaft surrounding the passline and wherein the take-up reel is rotatably mounted on the shaft around the passline, the reel being tapered towards an open end of the reel so as to allow for removal of binder from the open end of the reel.

10. An apparatus for removing spirally wrapped binder from around a telecommunication cable core comprising:

drive means disposed at a location along a passline for cable core, the drive means for continuously rotating around the passline a take-up reel for binder when the take-up reel is disposed in a take-up reel station;

binder unwinding and guide means which is freely rotatable about the passline and is operable for guiding binder to the take-up reel station from a cable core moving along the passline whereby during operation of the drive means with a take-up reel in the take-up reel station, binder is guided from the cable core and taken up around the take-up reel thereby tensioning the binder, the binder tension causing rotating of the unwinding and guide means about the cable core so as to cause unwinding of the binder from the core;

the binder unwinding and guide means providing a winding traverse mechanism traversable by rotation of the binder unwinding and guide means, for guiding binder axially to and from from end to end of the take up reel as binder is taken up onto the take up reel; and means to control the speeds of rotation of the take-up reel and of the unwinding and guide means relative to the cable core speed along the passline, the control means including a disc brake operably connected to the unwinding and guide means and a switch means, the switch means being operable to cause operation of the brake when the position at which binder leaves the cable core reaches a certain limiting location upstream, so as to slow down rotation of the unwinding and guide means, the speed of rotation of the take up reel being dependent on the tension in the binder during operation of the brake, so that the binder is in tension during take-up of binder and is controllably unwound from the core.

11. A method of removing binder from around a telecommunications cable core, the method comprising:

controllably moving the cable core along a passline through a binder take-up reel while continuously rotating the binder take-up reel about the cable core at a desired rotational speed relative to the cable core speed along the passline; and during movement of the cable core along its passline and during rotation of the take-up reel;

passing and guiding the binder from the core and through a binder guide means which is freely rotatable around the passline and around the binder take-up reel;

winding the binder around the rotating take-up reel thereby tensioning the binder while guiding the binder axially to and from from end to end of the take-up reel as the binder is wound around the take-up reel, whereby the tension in the binder causes rotation of the binder guide means around the cable core so as to unwind the binder from the core, and controlling the speed of rotation of the binder guide means by applying a brake to the freely rotating guide means to slow down free rotation of the guide means, the step of passing the binder through a binder guide means comprising passing the binder through a pivotally mounted guide element of the binder guide means, the pivotal position of the guide element being dependent upon the angle of the binder leaving the cable core, and the guide element causing activation of a switch at a certain pivotal position of the guide element corresponding to a limiting position of the binder upstream as it leaves the cable core, the switch controlling the brake to slow down the free rotation of the guide means whereby the point of detachment of the binder from the cable core is maintained downstream of a limiting point along the passline.

* * * * *